US006141610A

United States Patent [19]

Rothert et al.

[11] Patent Number: 6,141,610

[45] Date of Patent: Oct. 31, 2000

[54] AUTOMATED VEHICLE MONITORING SYSTEM

[75] Inventors: Mary F. Rothert, Portola Valley; James M. Janky, Los Altos, both of Calif.

[73] Assignee: Trimble Navigation Limited, Sunnyvale, Calif.

[21] Appl. No.: 09/149,902

[22] Filed: Sep. 8, 1998

[51] Int. Cl.[7] .................................................... G06F 7/00

[52] U.S. Cl. ................................ 701/35; 701/29; 701/30; 340/438

[58] Field of Search ................................ 701/25, 29, 30, 701/31, 34, 35, 32, 36; 340/901, 902, 425.5, 438, 439, 459

[56] References Cited

U.S. PATENT DOCUMENTS

| | | | |
|---|---|---|---|
| 5,006,829 | 4/1991 | Miyamoto et al. | 340/459 |
| 5,815,093 | 9/1998 | Kikinis | 340/937 |
| 5,974,368 | 10/1999 | Schepps et al. | 701/35 |
| 6,006,148 | 12/1999 | Strong | 701/33 |
| 6,011,461 | 4/2000 | Luper | 701/34 |

*Primary Examiner*—William A. Cuchlinski, Jr.
*Assistant Examiner*—Gertrude Arthur
*Attorney, Agent, or Firm*—Wagner Murabito & Hao LLP

[57] ABSTRACT

A method and apparatus that allows for monitoring the operation and usage of a vehicle. A data logger is installed in a vehicle to be monitored. The data logger couples to the vehicle's electronic system and monitors data relating to usage and condition of the vehicle. In one embodiment, the data logger includes a position determining system for determining whether the vehicle has traveled outside of a predetermined area and accelerometers for determining whether the vehicle has been involved in a collision. The data logger transmits information relating to the condition and usage of a vehicle each time that a vehicle return to a facility. The information relating to the condition and usage of the vehicle is then coupled to a computer. This allows for easily monitoring the usage and condition of vehicles without requiring manual data entry.

13 Claims, 6 Drawing Sheets

AUTOMATED VEHICLE MONITORING SYSTEM

TECHNICAL FIELD

This invention relates to vehicle monitoring systems. Specifically, the present invention relates to an apparatus and a method for monitoring usage and condition of a vehicle.

BACKGROUND ART

Many businesses have a need to monitor the usage and condition of a vehicle. One of the items that is commonly monitored is the distance that the vehicle has traveled. This information is typically registered on an odometer that is located on the dashboard of the vehicle. Odometers typically include six or seven wheels that rotate as the vehicle moves. These wheels have numbers printed on each wheel that indicate miles and tenths of miles. Depending on the purpose for which the vehicles is being used, the usage and condition of a vehicle is either recorded at fixed time intervals or is recorded after specific events. Fixed time periods that are typically used include, for example, daily, weekly, monthly, quarterly, or annual periods. Specific events that require recordation of the condition and usage of a vehicle include, for example, each maintenance, each extended trip, or each usage.

The process of monitoring the condition and usage of a vehicle is time consuming. Also, errors in recording the usage and condition of a vehicle are common. Mileage is one factor that indicates the usage of a vehicle. The process of recording mileage is time consuming and prone to error. Typically, an individual must travel to the vehicle, open the vehicle, and look at the odometer to determine visually the indicated mileage. The user then typically writes the mileage down on a pad. The mileage is then typically entered manually into a computer. This process is repeated for each vehicle. Errors commonly occur from incorrectly reading the small numbers on each wheel from incorrectly writing down the numbers, or from incorrectly entering the numbers into the computer. Thus, the process for monitoring mileage is time consuming and expensive, particularly for businesses that maintain large fleets of vehicles.

Other items that relate to the condition of the vehicle must also be monitored such as, for example, the fluid levels of a vehicle, whether the vehicle is operating properly, whether the vehicle has been damaged in a collision, and whether the vehicle requires service. This data is then used to monitor usage of the vehicle. Data relating to the usage of the vehicle, includes, for example, the amount of gasoline used and the distance traveled. Another factor relating to usage of the vehicle that needs to be monitored is whether the vehicle has traveled outside of a specific area.

One business that requires frequent monitoring of the usage and condition of the vehicles in its fleet is the automotive rental business. Typically, each time a vehicle is rented, the automotive rental facility must ascertain the mileage of the vehicle and the amount of gas in the vehicle. In addition, once the vehicle is returned, the automotive rental facility must again determine the mileage of the vehicle, the amount of gas in the vehicle, and whether the vehicle is operating properly.

The vehicle is typically also inspected for damage due to collision. This inspection typically involves visually inspecting the exterior of the vehicle. This inspection process is prone to error. More particularly, when the damage is slight, it is often overlooked. In addition, because minor dents and dings may be confused with previous damage to the vehicle, it is often impossible to determine whether or not the damage was done by a particular renter. In addition, when the renter takes steps to disguise the damage, or when the renter makes repairs, the damage may not be easily identified.

Once the required information is determined, it is entered into a computer. The computer subtracts the mileage of the vehicle when it was rented from the mileage of the vehicle after the vehicle is returned to determine the distance traveled during the rental. Similarly, the amount of gas in the vehicle when the vehicle was rented is subtracted from the amount of gas in the vehicle when the vehicle is returned to determine the amount of gas used. The user is typically charged on the basis of the period of time that the vehicle was rented, the number of miles traveled, and the amount of gas used. An invoice is then printed. The process of obtaining the required information is time consuming and expensive. In addition, the renter must wait while the required information is being gathered, entered into the computer, and processed.

Typically, the vehicle is again inspected as it is being cleaned and the vehicle is checked to assure that it is operating properly. This check typically consists of verifying that fluid levels of oil, brake fluid, transmission fluid, coolant, etc. are within acceptable ranges. Typically, the vehicle is run for a short time to verify that the vehicle is operating properly. This inspection process is also time consuming and expensive.

One problem encountered by businesses that have fleets of vehicles is usage outside of designated service areas. This is particularly problematic in areas that border foreign countries when operation of the vehicle in the bordering foreign country is not allowed. Often insurance policies do not cover damage in the foreign country. Thus, usage in a foreign country may result in losses that are not covered by insurance and possible cancellation of insurance.

Recently, car rental companies have used a personal digital assistant (PDA) devices for coupling information from the vehicle to the computer that processes the information. These PDA devices are effective for transmitting information to a central computer. However, the operator must determine the information to be entered into the PDA and the operator must enter the information in manually. This process is time consuming and can result in operator generated errors. More particularly, the operator may incorrectly read the information, or incorrectly enter the information into the PDA device.

What is needed is a way to easily obtain information on the condition and usage of a vehicle. More particularly, a method and apparatus is needed for easily and cost effectively obtaining accurate information pertaining to the usage and condition of a vehicle. The present invention provides an elegant solution to the above needs.

DISCLOSURE OF THE INVENTION

The present invention provides a method and apparatus that provides for easily, accurately, and cost effectively obtaining information pertaining to the usage and condition of a vehicle.

A data logger that includes a radio transmitter and a position determining system is disposed in each vehicle that is to be monitored. The data logger is coupled to the electrical system of the vehicle. The data logger obtains data pertaining to the usage and condition of the vehicle. When the vehicle returns to a facility that includes a radio receiver that is coupled to a computer, the data logger transmits the data pertaining to the usage and condition of the vehicle to the computer via radio.

The automated vehicle monitoring system of the present invention is well adapted for use in a car rental facility. Upon the return of the vehicle, the data pertaining to the use and condition of the vehicle is used to determine the charges to be paid by the renter. More particularly, the distance traveled by the renter is easily calculated. In addition, the position determining system allows for determining whether or not the renter has traveled outside of a predetermined area. In one embodiment, the data logger includes accelerometers for determining whether the vehicle has been involved in an accident and transmits data upon the return of the vehicle that indicates whether the vehicle has been involved in an accident.

In one embodiment, a radio transmitter is located at each facility for transmitting a radio signal that indicates that the vehicle has been rented and a second radio transmitter is located at each facility for transmitting a radio signal indicating the return of the vehicle. As the first transmission is received, relevant data regarding the condition of the vehicle is recorded and data pertaining to prior rentals is deleted. The data that is recorded includes mileage and fuel level. The data logger then obtains data pertaining to the usage and condition of the vehicle as the vehicle is being operated. Upon receiving the second transmission that indicates the return of the vehicle, the data logger determines the data pertaining to the usage and condition of the vehicle and transmits the data. In one embodiment, upon receiving the second transmission, relevant data regarding the condition of the vehicle is recorded and is transmitted along with data relating to the usage of the vehicle. Data relating to the usage includes data indicating whether the vehicle has traveled outside of a designated service area. This information is received by the computer at the rental facility and is processed to compute the charges to be paid by the renter.

The method and apparatus of the present invention is easier and quicker than prior art methods for obtaining information on the usage and condition of vehicles. More particularly, because there is no need to visually determine the odometer reading and the amount of gas in the vehicle, and no need to manually enter the information into a PDA device or a computer as is required by prior art processes, the present invention is easier, quicker, and more cost effective than prior art methods.

In addition, the present invention allows for easily determining where the vehicle has traveled. Thus, the present invention allows for easily determining whether the vehicle has traveled out of a designated area. This allows for easily penalizing customers who take vehicles out of authorized usage areas.

Also, the present invention allows for easily determining whether or not the vehicle has been involved in an accident. This allows for a user to be charged for damage to the vehicle. This is particularly useful in situations where there is minimal damage to the vehicle that may not be easily spotted visually, when the damage is concealed, and when repairs are made.

These and other objects and advantages of the present invention will no doubt become obvious to those of ordinary skill in the art after having read the following detailed description of the preferred embodiments that are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
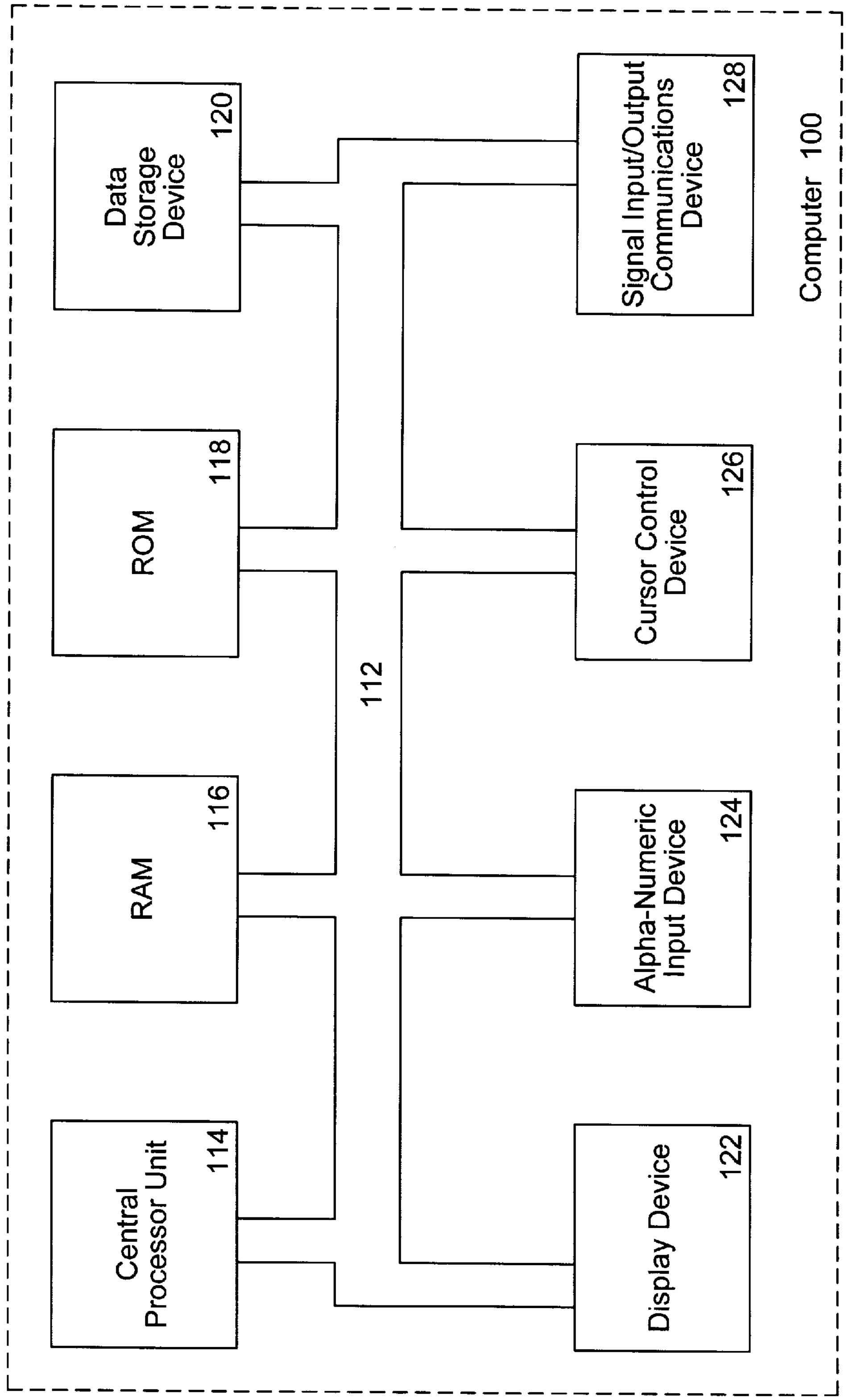
FIG. 1 is a schematic diagram of an exemplary computer system used as a part of an automated vehicle monitoring system in accordance with the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc. is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "designating", "incorporating", "calculating", "determining", "communicating" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

With reference now to FIG. 1, portions of the automated vehicle monitoring system of the present invention are comprised of computer executable instructions that reside in a computer system. FIG. 1 illustrates an exemplary computer system 100 used as a part of an automated vehicle monitoring system in accordance with the present invention. It is appreciated that the computer system 100 of FIG. 1 is exemplary only and that the present invention can operate within a number of different computer systems including general-purpose computers systems, embedded computer systems, and stand alone computer systems.

Computer system 100 of FIG. 1 includes an address/data bus 112 for communicating information, a central processor unit 114 coupled to bus 112 for processing information and instructions. Computer system 100 also includes data storage features such as a random access memory (RAM) 116 coupled to bus 112 for storing information and instructions for central processor unit 114, a read only memory (ROM) 118 coupled to bus 112 for storing static information and instructions for the central processor unit 114, and a data storage device 120 (e.g., a magnetic or optical disk and disk drive) coupled to bus 112 for storing information and instructions. Computer system 100 of the present embodiment also includes a display device 122 coupled to bus 112 for displaying information to a computer operator. An alphanumeric input device 124 including alphanumeric and function keys is coupled to bus 112 for communicating information and command selections to central processor unit 114.

Display device 122 of FIG. 1, utilized with computer system 100 of the present invention, may be a liquid crystal device, cathode ray tube, or other display device suitable for creating graphic images and alphanumeric characters recognizable to the user. Cursor control device 126 allows the computer user to dynamically signal the two-dimensional movement of a visible symbol (cursor) on a display screen of display device 122. Many implementations of cursor control device 126 are known in the art including a trackball, mouse, touch pad, joystick or special keys on alphanumeric input device 124 capable of signaling movement of a given direction or manner of displacement. Alternatively, it will be appreciated that a cursor can be directed and/or activated via input from alphanumeric input device 124 using special keys and key sequence commands. The present invention is also well suited to directing a cursor by other means such as, for example, voice commands. Computer system 100 also includes a cursor control device 126 coupled to bus 112 for communicating user input information and command selections to central processor unit 114, and a signal input output communication device 128 (e.g. a modem) coupled to bus 112.

Figure 2:
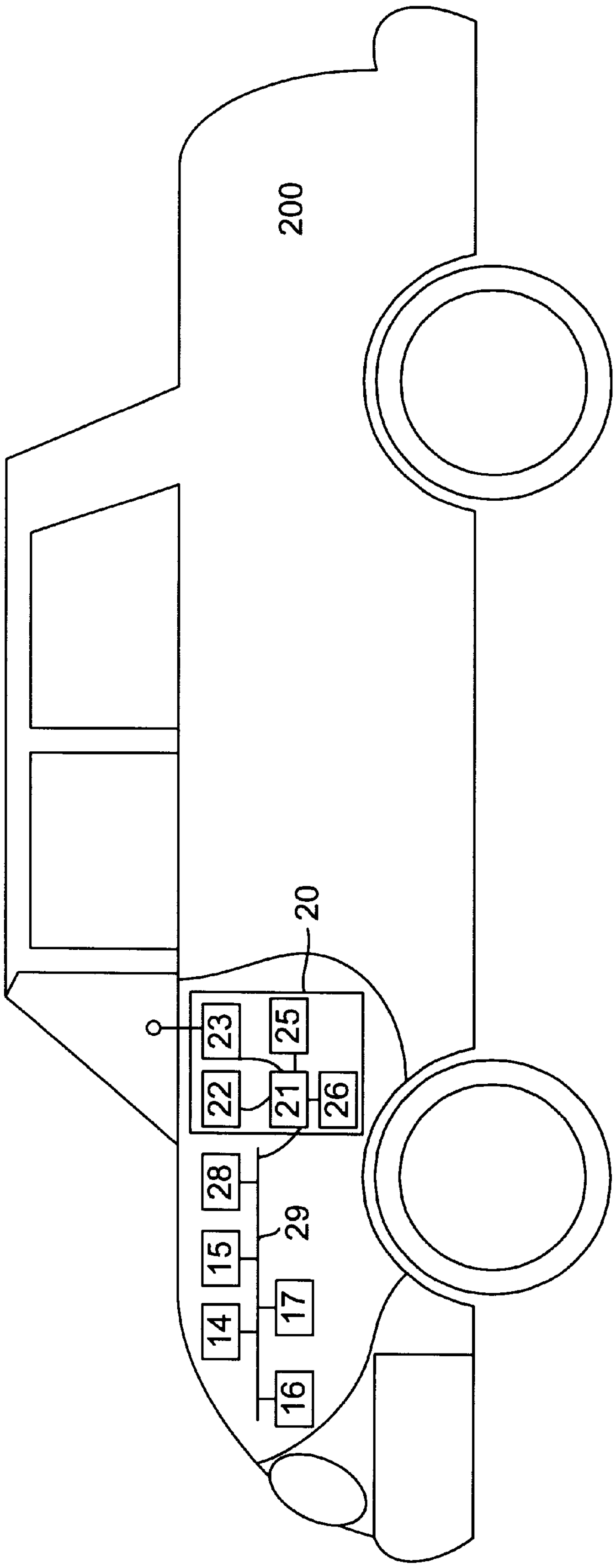
FIG. 2 is a diagram of a data logger that is attached to a vehicle having a data bus in accordance with one embodiment of the present claimed invention.
Figure 3:
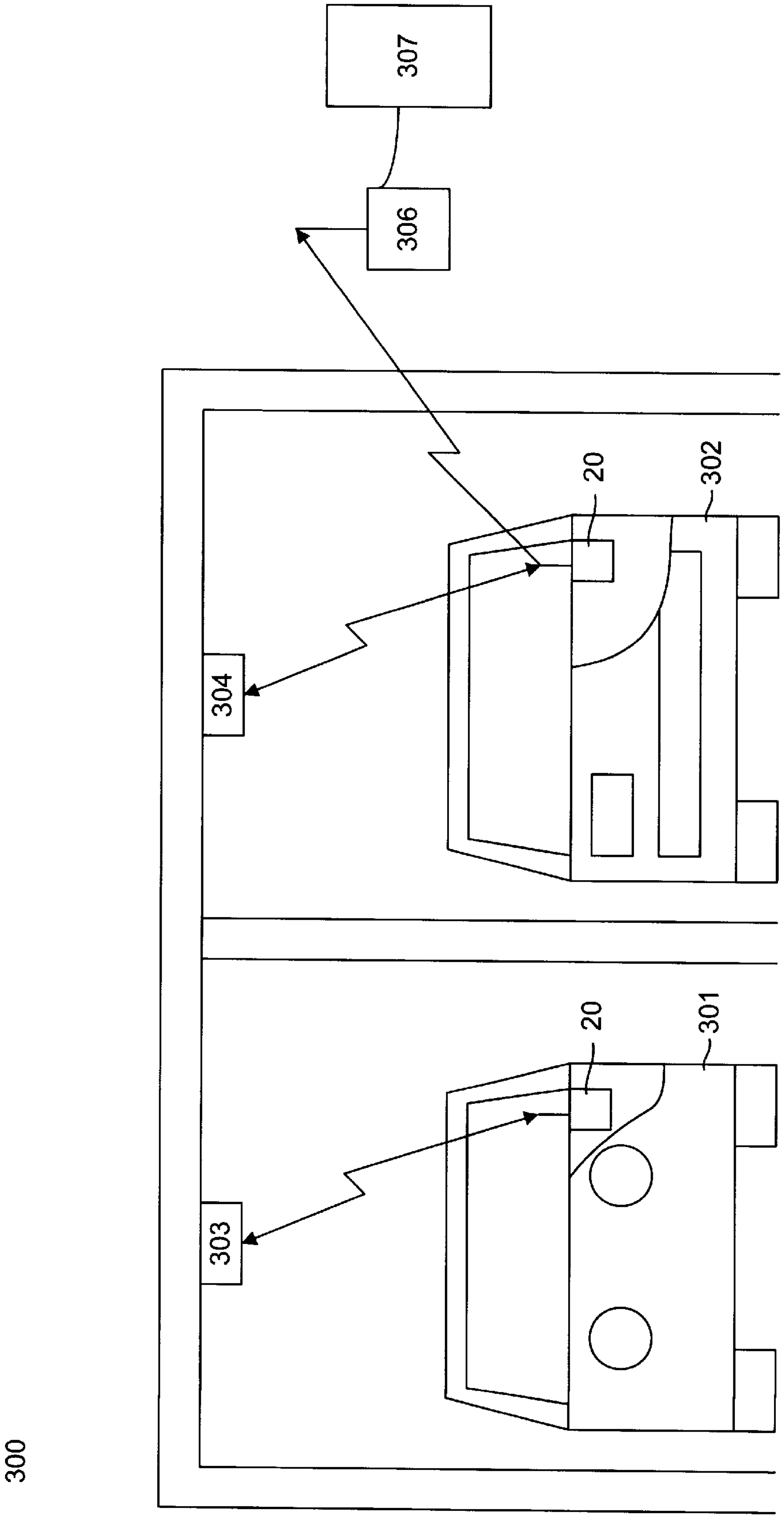
FIG. 3 is a diagram showing an automated vehicle monitoring system that includes two transmitters in accordance with one embodiment of the present claimed invention.
Figure 4:
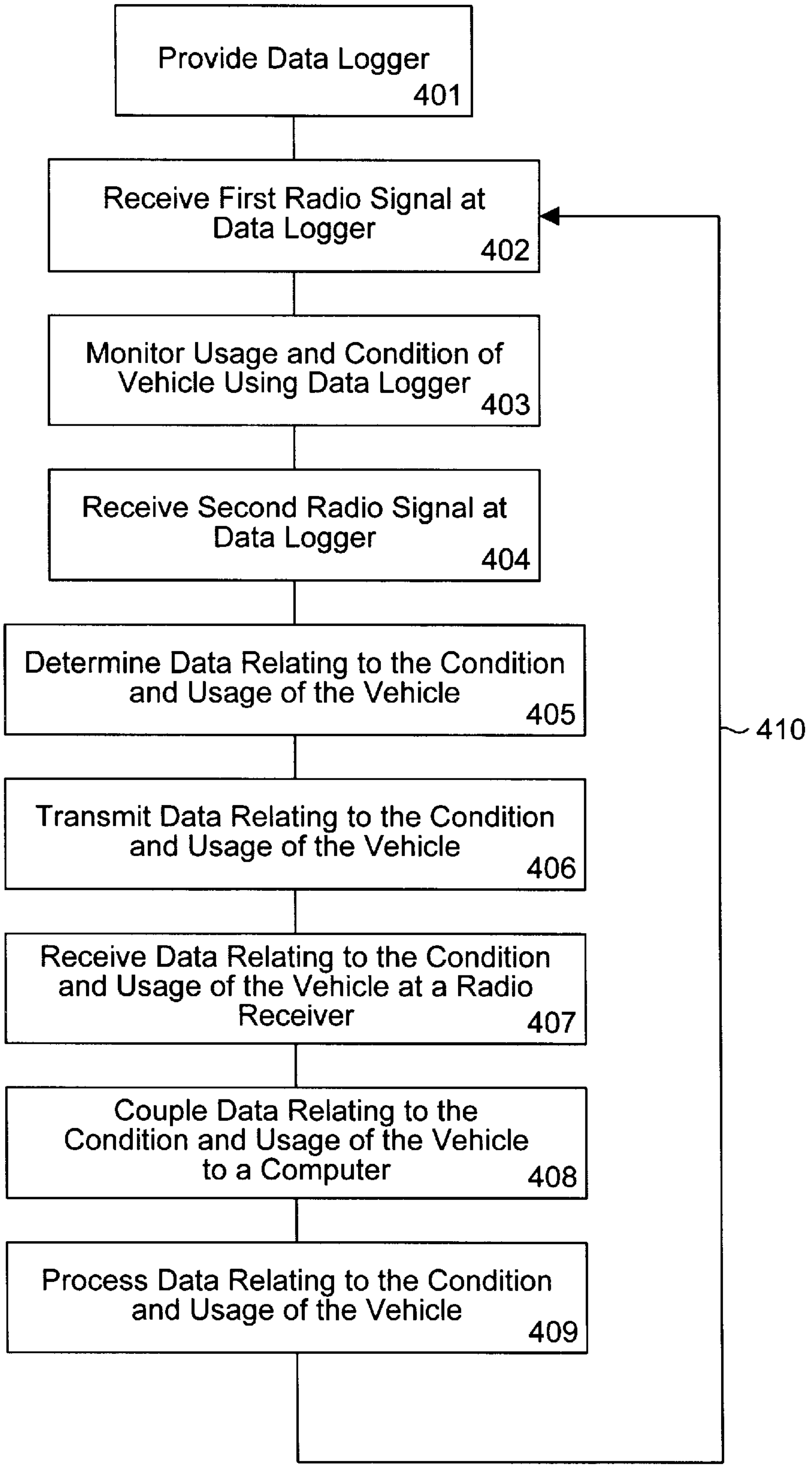
FIG. 4 is a diagram showing a method for monitoring the usage and condition of a vehicle using a data logger in accordance with one embodiment of the present claimed invention.

FIGS. 2–4 show an embodiment of the present invention that includes a data logger that couples to the electronic system of a vehicle. Referring now to FIG. 2, an exemplary vehicle 200 is shown to include sensors 201–205 that monitor the vehicle. Sensors 14–17 are coupled vehicle diagnostic unit 28 via bus 29. Sensors 14–17 monitor the condition of vehicle 200 and the usage of vehicle 200 and relay information to diagnostic unit 28 over bus 29. Diagnostic unit 28 analyzes information from sensors 14–17 so as to assure proper operation of vehicle 200 and so as to flag error conditions with the flags stored in data storage registers. In some vehicles, the information monitored by the vehicle's electronic system includes mileage, fluid levels, and whether maintenance is required. Typically, the fluid levels that are monitored include gas and oil levels.

Continuing with FIG. 2, data logger 20 is shown to include controller 21, data storage device 22, communication unit 23 and position determining system 25. Controller 21 electrically couples to each of data storage device 22, communication unit 23, and position determining system 25. Controller 21 controls the operations of data logger 20. In one embodiment, data storage device 22 is a semiconductor device that provides non volatile data storage, such as, for example, a Static Random Access Memory (SRAM) device. Communication unit 23 may be any of a number of commercially available systems. In one embodiment, communication unit 23 is an integrated transceiver that can perform both transmission and reception of radio signals.

In one embodiment, communication unit 23 of FIG. 2 is a wireless data modem adapted to send and receive data. In one embodiment, communication unit 23 is a wireless data modem made by Motorola, Inc. of Schaumburg, Ill. Alternatively, communication unit 23 is a standard radio transceiver (or a radio transmitter and a radio receiver). In one embodiment, communication unit 23 transmits and receives data over an unlicensed radio frequency. However, licensed frequency bands could also be used. Data may be transmitted using any of a number of different transmission methods and formats and may be single-channel or multichannel. In one embodiment time division multiple access (TDMA) transmission is used for conveying data. In one embodiment, communications unit 23 is a packet radio such as those made by Metricom, Inc., of Los Gatos, Calif.

Still referring to FIG. 2, data logger 20 is electrically coupled to bus 29 such that controller 21 may monitor the information from sensors 14–17 as information is transmitted to diagnostic unit 28 over bus 29. In one embodiment, sensors 14–17 transmit information regarding the usage of vehicle 200 and the condition of vehicle 200. This information is received by data controller 21 and is stored in data storage device 22.

Continuing with FIG. 2, position determining system 25 is coupled to controller 21 and is adapted to determine the position of vehicle 200. The determined position of vehicle 200 is periodically transmitted to controller 21. Controller 21 processes the received position according to predetermined criteria, and when required, stores the determined position in data storage device 22 for later retrieval.

Continuing with FIG. 2, in one embodiment, position determining system 25 uses satellites of the U.S. Global Positioning System (GPS) to determine position. The GPS includes a constellation of GPS satellites, each of which broadcast ephemerides and other data that allows for the elapsed time of flight for each satellite's signals to reach the position determining system to be determined. When data is received from multiple satellites, position may be determined using the calculated elapsed time of flight and ephemerides from each satellite. A useful discussion of the GPS and techniques for obtaining position information from satellite signals is found in Tom Logsdon, The Navstar Global Positioning System, Van Nostrand Reinhold, 1992, pp. 17–90, which is incorporated by reference herein. Alternatively, systems that use other references for determining position may be used such as position determining systems that use Loran, Global Orbiting Navigation Satellite System (GLONASS), or fixed, land based beacons may be used.

In one embodiment, data logger 20 also includes internal sensors 26 that detect rapid acceleration and deceleration. In this embodiment, when rapid acceleration or rapid deceleration is detected by internal sensors 26, data regarding the acceleration or deceleration is transmitted to controller 21 and is stored in data storage device 22 for later retrieval. Alternatively, sensors for monitoring any of a number of other conditions may be included into sensors 26.

In one embodiment, controller 21 is a microprocessor that operates in response to a computer program that runs on the microprocessor. Alternatively, a program is imbedded into the microprocessor. In one alternate embodiment, controller 21 is an ASIC device that is programmed to perform the desired functions is used. Alternatively, controller 21 is a FPGA device that is programmed to perform the desired functions. Alternatively, a general purpose computer such as computer 100 of FIG. 1 may be used to control the operations of data logger 20.

Referring now to FIG. 3, automated vehicle monitoring system 300 is shown to be monitoring the usage and condition of vehicles 301 and 302. Automated vehicle monitoring system 300 includes a data logger 20 installed into each of the vehicles to be monitored. Automated vehicle monitoring system 300 also includes transmitters 303–304. Transmitters 303 and 304 transmit a signal that is adapted to be received by data logger 20. In one embodiment, transmitters 303 and 304 transmit radio signals continually at a low power such that their transmission is received by each vehicle that passes under one of transmitters 303 or 304. Thus, in operation, when a vehicle leaves the vehicle rental facility, a transmission is received by transmitter 303 and when the vehicle returns, it receives a transmission from transmitter 304. The receipt of a transmission from transmitter 303 and from transmitter 304 signals to the data logger that a particular action is to be taken.

In one embodiment, communication unit 306 of FIG. 3 is a wireless data modem made by Motorola, Inc. of Schaumburg, Ill. Alternatively, communication unit 306 is a standard radio transceiver (or a radio transmitter and a radio receiver). In one embodiment, communication unit 306 transmits and receives data over an unlicensed radio frequency. However, licensed frequency bands could also be used. Data may be transmitted using any of a number of different transmission methods and formats and may be single-channel or multi-channel. In one embodiment time division multiple access (TDMA) transmission is used for conveying data. In one embodiment, communications unit 306 is a packet radio such as those made by Metricom, Inc., of Los Gatos, Calif. In another embodiment, the data is relayed by an infrared transmitter receiver system such as is currently found in computer to printer data transfer systems, and manufactured by Hewlett Packard of Palo Alto, Calif.

Referring now to FIG. 4, a method for monitoring the usage and condition of a vehicle is disclosed. More particularly, the method of FIG. 4 is used to monitor a vehicle that includes an electronic system that has sensors that monitor the vehicle. First, as shown by step 401, a data logger is provided. The data logger is coupled to the electronic system of a vehicle. In one embodiment, a data logger such as data logger 20 of FIG. 2 is used.

Continuing with FIG. 4, as a vehicle leaves the vehicle rental facility, a first signal is received as is shown by step 402. In the embodiment shown in FIG. 3, this first signal is transmitted by transmitter 303 and is received by data logger 20 as vehicle 301 passes under transmitter 303. In the embodiment shown in FIG. 2, receiver 24 receives the first signal and couples the signal to controller 21. When the facility is a vehicle rental facility, the signal indicates that the vehicle has been rented. This signal is received at the data logger that then determines the mileage of the vehicle, saves the mileage of the vehicle, and clears data that pertains to prior rentals. In the embodiment shown in FIG. 2, controller 21 saves the mileage of the vehicle in data storage device 22.

Continuing with FIG. 4, the data logger then monitors the usage and condition of the vehicle as shown by step 403. Relevant information is stored in a data storage device for later retrieval. In the embodiment shown in FIG. 2, controller 21 is operable to store relevant information in data storage device 22.

When the vehicle is returned, a second signal is received at the data logger as shown by step 404. In the embodiment shown in FIG. 3, the second signal is received as vehicle 302 passes under transmitter 304.

Continuing with FIG. 4, upon receipt of the second signal, the data logger determines data relating to the condition and usage of the vehicle as is shown by step 405. In the embodiment shown in FIG. 2, the process of determining the data relating to the condition and usage of the vehicle is performed by controller 21.

When the vehicle includes a data bus that couples to data storage registers that contain data relating to the usage of the vehicle and data relating to the condition of the vehicle, the data logger requests the needed data over the vehicle's electrical bus by polling the data storage registers. In the embodiment shown in FIG. 2, controller 21 polls diagnostic unit 28 over bus 29 to obtain the desired information. Alternatively, the data logger accumulates data from the time that the first signal is received until the second signal is received and stores relevant data in data storage, recalling the needed data so as to obtain data pertaining to the usage and condition of the vehicle. In the embodiment shown in FIG. 2, controller 21 obtains the required information from transmissions over data bus 29 and stores relevant data in data storage device 22.

In one embodiment, the information relating to the usage of the vehicle includes the mileage of the vehicle. In this embodiment, data relating to the condition of the vehicle includes the amount of fuel in the vehicle (and other fluid levels when available) and whether the vehicle requires service.

Other data that relates to the condition of the vehicle includes data indicating whether a collision has occurred. In one embodiment, the data logger determines if a collision has occurred by analyzing data from the sensors that monitor acceleration and deceleration. Also, in vehicles that transmit data that may indicate a collision, such as, for example, data indicating activation of the automated braking system, activation of airbags, malfunctioning vehicle components, etc., such data is also received by the data logger.

Continuing with FIG. 4, the data relating to the usage and condition of the vehicle is then transmitted as is shown by step 406. In the embodiment shown in FIG. 2, communication unit 23 is used to transmit the data. In one embodiment, the transmission includes identification information that identifies the vehicle and a second identification number that identifies the particular rental. By using an identification number that identifies each particular rental, data is easily monitored and tracked. In one embodiment, the identification that identifies the particular rental is contained in a counter that is updated each time that a new rental begins.

The transmitted data is then received by a receiver as is shown by step 407. In the embodiment shown in FIG. 3, the data is received by communication unit 306.

The transmitted data relating to the usage and condition of the vehicle is then coupled to a computer as is shown by step 408. In an embodiment where communication unit 306 is a radio receiver, radio transmissions are received, demodulated, and transmitted to computer 307. In the embodiment shown in FIG. 3, computer 307 is coupled to communication unit 306 via a standard electrical cable. In one embodiment, a computer such as computer 100 of FIG. 1 is used.

In one embodiment, the designated signal described in FIG. 4 is a radio signal and transmission and reception of this signal and transmission and reception of data is by radio. In this embodiment, step 402 includes receiving a first radio signal at the data logger, step 404 includes receiving a second radio signal at the data logger, and step 407 includes receiving data relating to the condition and usage of the vehicle at a radio receiver. In one embodiment, radio transmission is over one or more unlicensed radio frequency(s). However, licensed frequency bands could also be used. Data may be transmitted using any of a number of different transmission methods and formats. In one embodiment time division multiple access (TDMA) transmission is used for conveying data.

Continuing with FIG. 4, the data relating to the usage and condition of the vehicle is then processed by the computer as shown by step 409. The method of processing the data and the results of the processing step are tailored to the needs of a particular user. For example, in a vehicle rental operation, the distance traveled by the vehicle between the time that the first signal is received until the second signal is received is calculated so as to determine the distance that the vehicle has traveled during a particular rental. Also, in a vehicle rental operation, the amount of gas in the vehicle at the time that the first signal is received is subtracted from the amount of gas at the time that the second signal is received so as to determine the amount of gas that a vehicle has used during a particular rental. The transmission also includes information identifying a particular vehicle which may be a identification number such as the Vehicle's Identification Number (VIN) or other identifying data.

The process of steps 402–409 is repeated for each usage as shown by line 410. In a vehicle rental operation, the process is repeated for each rental.

In one embodiment, data relating to the usage of the vehicle includes the determined positions from the position determining system, which is used to determine if the vehicle has traveled outside of a designated area. In the embodiment shown in FIG. 2, position determining system 25 is used to periodically determine the position of the vehicle. The determined positions may be stored and transmitted as data relating to the usage of the vehicle, or the information may be processed as it is obtained by controller 21 to determine whether the vehicle has traveled outside of a predetermined area. In one embodiment, the allowed service area is programmed into controller 21 and positions are processed by controller 21 as they are received to determine whether the vehicle has traveled out of the designated service area. When the determined positions are out of the designated service area, the positions that are out of the designated service area are stored in a data storage register 22.

The determination as to whether a renter stays within a designated area may be used in pricing of the vehicle rental services. This allows for more flexible pricing of services. For example, a vehicle rental company may designate that discounts are available for users who only use a rental vehicle within the metropolitan area in which the vehicle is originally rented. This feature may also be used to determine whether a renter has taken a vehicle out of the country. This is particularly important for vehicle rental companies that maintain insurance policies on their vehicles that only cover vehicles when the vehicles are in the same country. In this instance, when the position determined by the position determining system indicates that the vehicle is out of the country, the position is stored. This allows vehicle rental companies to penalize users who violate restrictions.

Figure 5:
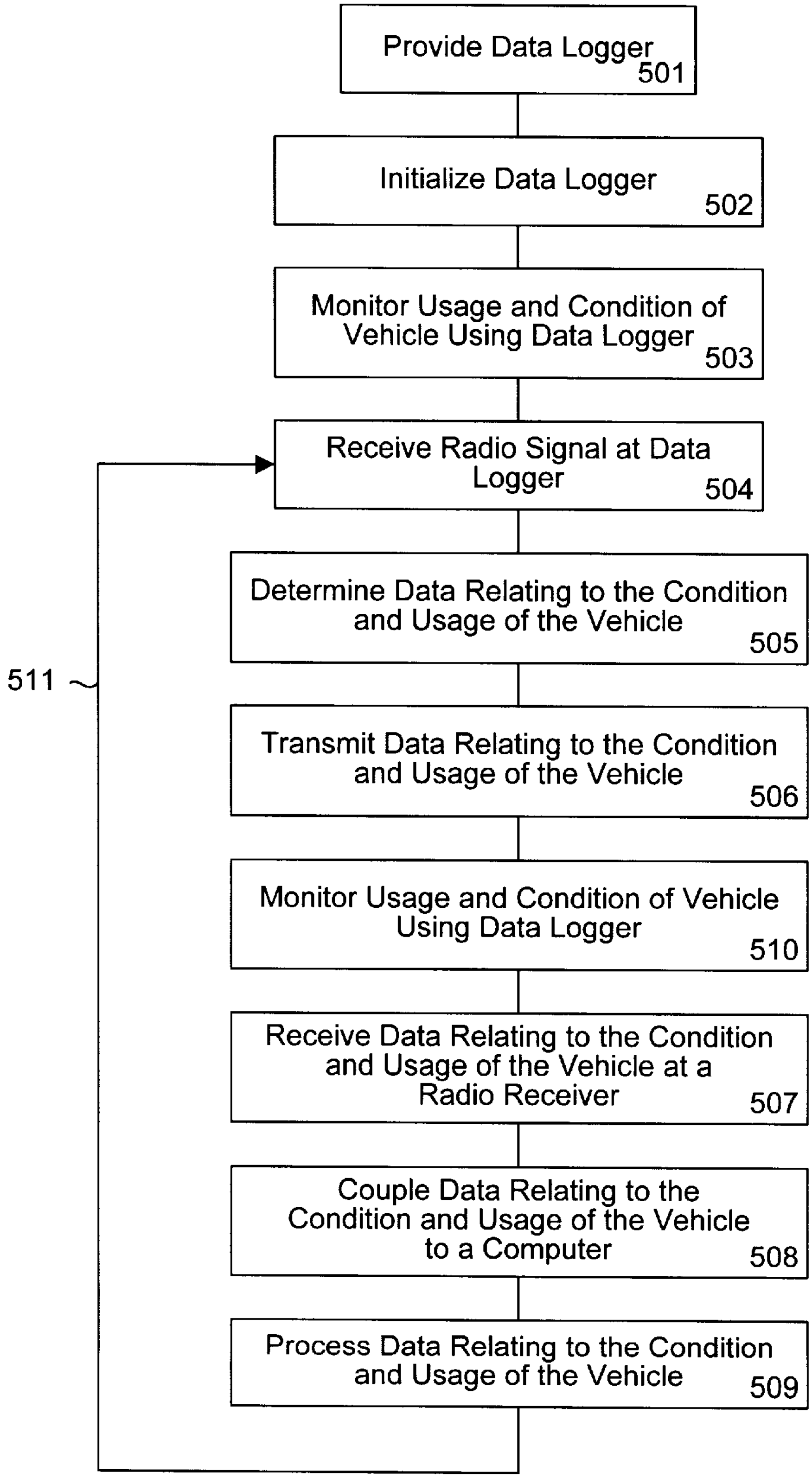
FIG. 5 is a diagram showing a method for monitoring the usage and condition of a vehicle using a single transmission to indicate the end of a first usage and the beginning of a second usage in accordance with one embodiment of the present claimed invention.

In an alternate embodiment that is shown in FIG. 5, a single transmission is used to indicate that monitoring is to begin and that data is to be determined and transmitted. In this embodiment, a single transmitter is required. Referring to the embodiment shown in FIG. 3, this may be accomplished by turning off transmitter 303. In this embodiment, a data logger is provided as is shown by step 501. The first time a vehicle is used, the data logger is initialized so as to indicate that usage is to begin as is shown by step 502. The usage and condition is then monitored, as shown by step 503 until such time as a signal is received at the data logger, shown by step 504.

Continuing with FIG. 5, upon the receipt of a designated signal, as shown by step 504, the data relating to the condition and usage of the vehicle is determined as shown by step 505. The data relating to the condition and usage of the vehicle is then transmitted as shown by step 506.

Continuing with FIG. 5, the data logger then monitors the condition and usage of the vehicle as is shown by step 510. In one embodiment, each time that a signal is received, a mileage counter is initialized. The mileage counter is then updated as the vehicle moves. Alternatively, the current mileage at the time the signal is received is stored in a data storage device. Other information regarding the usage and condition of the vehicle is also monitored such as fluid levels, whether or not a collision has occurred, position of the vehicle, etc.

Continuing with FIG. 5, the data relating to the condition and usage of the vehicle is then received at a receiver as shown by step 507, coupled to a computer as shown by step 508, and processed as shown in step 509.

As shown by line 511, the process repeats each time that a designated signal is received. Thus, the method for monitoring the condition and usage of a vehicle shown in FIG. 5 is well adapted for use on vehicle rental operations. In such operations, each time that a vehicle is returned, a designated signal is transmitted to the data logger. This one signal both indicates the end of a first renter's usage and the beginning of a second renter's usage.

In one embodiment, the designated signal described in FIG. 5 is a radio signal and transmission and reception of this signal and transmission and reception of data is by radio. In this embodiment, step 504 includes receiving a radio signal at the data logger and step 507 includes receiving data relating to the condition and usage of the vehicle at a radio receiver. In one embodiment, radio transmission is over one or more unlicensed radio frequency(s). However, licensed frequency bands could also be used. Data may be transmitted using any of a number of different transmission methods and formats. In one embodiment time division multiple access (TDMA) transmission is used for conveying data.

Continuing with FIG. 5, because a single transmission is used to indicate both the end of the first renter's usage and the beginning of the second renter's usage, the usage between the time that the vehicle is returned and the time the vehicle is driven off by a subsequent renter is attributed to the subsequent renter. This works well for operations where the vehicles are not moved, used, or damaged between the time that the vehicle is returned and the time that the vehicle leaves the facility on the next rental. However, usage and or damage to the vehicle may be imputed to a renter when in fact the usage and/or damage occurred between the time that the vehicle was returned and the time that the subsequent renter took possession of the vehicle.

Figure 6:
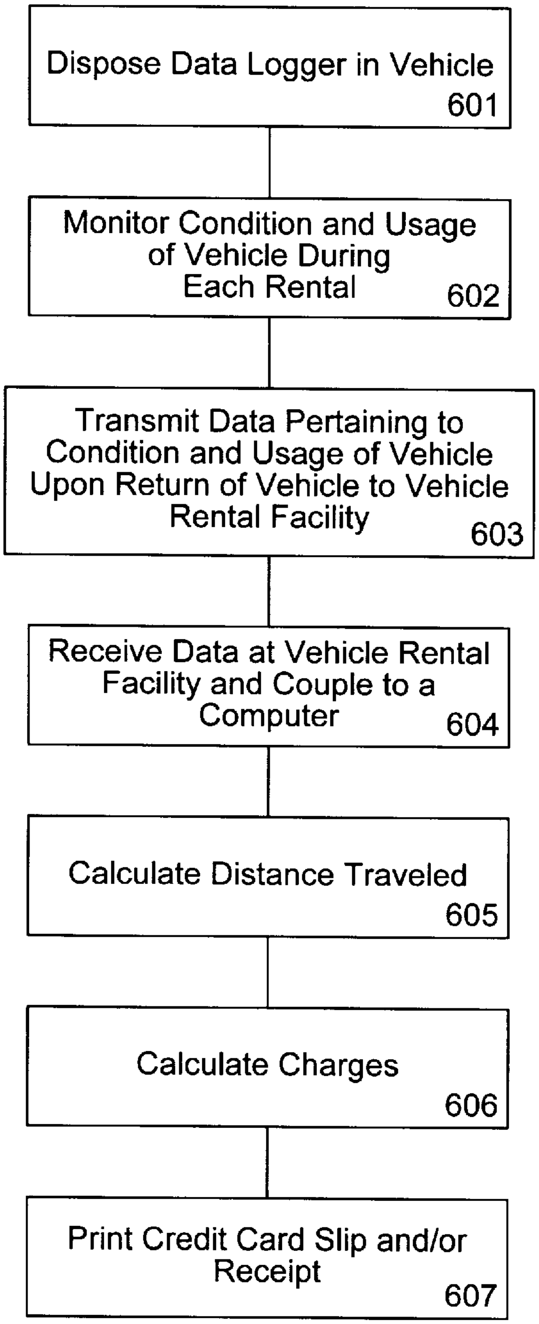
FIG. 6 is a diagram showing a method for monitoring the usage and condition of a vehicle used in a vehicle rental operations in accordance with one embodiment of the present claimed invention.

As shown in FIG. 6, the automated vehicle monitoring system of the present invention is well suited for use in a vehicle rental operation. By disposing a data logger in each vehicle in the rental fleet (step 601), the condition and usage of each vehicle during each rental is monitored (step 602). As each vehicle is returned to the vehicle rental facility, the required information pertaining to the usage and condition of the vehicle is transmitted (step 603). This information is received at the vehicle rental facility and is coupled to a computer(step 604). The computer then calculates the distance traveled during the rental(step 605)which is then used to determine the appropriate charges(606). The determination of the appropriate charges to be paid by the renter may include other factors such as the number of days that the vehicle has been rented, the amount of gas used, whether the vehicle has been involved in a collision, and whether or not the vehicle has traveled outside of a designated area. A credit card slip is then automatically printed that reflects the appropriate charges(step 607). An invoice may also be printed. The credit card slip and the invoice will then be quickly available. Thus, there is no need for a renter to stand in long lines or wait for an attendant to determine the relevant information. This saves time for both the renter and for the vehicle rental operation.

The automated vehicle monitoring system of the present invention is well adapted for use with various different data transmission devices and transmission formats. In one embodiment infrared transmission is used to convey data. In an embodiment that uses infrared transmission, the transmitting device is an infrared transmitter and the receiving device is an infrared receiver. When a component requires both an infrared transmitter and an infrared receiver, an integrated infrared transceiver may be used. In the embodiment shown in FIG. 2, when infrared transmission methods are used, communication unit 23 receives and transmits via infrared transmission methods. Referring now to FIG. 3, transmitters 303–304 may be infrared transmitters, and communication unit 306 may be an infrared receiver. In the embodiment shown in FIG. 4, when infrared transmission methods are used, step 402 includes receiving a first infrared signal at the data logger, step 404 includes the receipt of a second infrared signal at the data logger, and step 407 includes receiving data relating to the condition and usage of the vehicle at an infrared receiver. Similarly, in the embodiment of FIG. 5, when infrared transmission methods are used, step 504 includes receiving an infrared signal at the data logger and step 507 includes receiving data relating to the condition and usage of the vehicle at an infrared receiver. Alternatively, a combination of infrared transmission methods and radio transmission methods could be used.

Many of the features of the present invention are described with reference to the usage of the present invention in a vehicle rental operation. However, the method and apparatus of the present invention are well adapted for any of a number of other uses. For example, the methods and apparatus of the present invention may be used in any situation where multiple vehicles must be monitored. That is, the present invention may be used to monitor travel by traveling salesmen, delivery personnel, truck drivers, etc.

The present invention is well adapted for determining the mileage traveled between events, such as, for example, the mileage traveled by a renter of a vehicle, or the mileage traveled by a delivery truck on a particular delivery. The automated vehicle monitoring system of the present invention is particularly useful in vehicle rental operations. In a vehicle rental operation, the distance traveled by the vehicle during the particular rental is calculated. The amount of charges to be paid by the renter is then calculated. In one embodiment, the distance traveled by the vehicle during the rental is used to compute the amount of charges to be paid by the renter. When the present invention is used in vehicle rental operations, other data such as the condition of the vehicle and the amount of fuel remaining is also used to calculate the charges due.

In one embodiment, when the automated vehicle monitoring system of the present invention is used in a vehicle rental operation, processing the data relating to the condition and usage of the vehicle (step 409) includes determining the charges to be paid by a user. The data relating to the condition and usage of the vehicle that is used to perform the calculations may include, the distance traveled by the vehicle during the rental, the amount of fuel used, damage to the vehicle, whether or not the vehicle has traveled out of the authorized area of usage, etc. Then a credit card slip and/or a receipt is printed. In the embodiment shown in FIG. 3, computer 307 calculates the charges using data received from communication unit 306 and prints a credit card slip that is given to the user.

Thus, the present invention allows for a single computer to monitor the usage and condition of a fleet of vehicles easily and cost effectively. In one embodiment, computer 307 is located in the vehicle rental facility such that communication unit 306 is able to receive transmissions from vehicles that are rented and returned. This allows transactions to be completed quickly and efficiently and reduces errors. In addition, costs are saved since there is no need to manually record data relating to the usage and condition of a vehicle each time a vehicle leaves and each time the vehicle returns.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for monitoring a vehicle that includes an electronic system that includes sensors, said method comprising the steps of:

a.) providing a data logger, said data logger disposed within said vehicle and coupled to said electronic system;

b.) receiving a first signal at said data logger, said first signal indicating the rental of said vehicle;

c.) monitoring the usage of said vehicle after the receipt of said first signal, data relating to the usage of said vehicle stored in said data logger;

d.) receiving a second signal at said data logger, said second signal indicating the return of said vehicle; and e.) transmitting said data relating to the usage of said vehicle.

2. The method for monitoring a vehicle of claim 1 wherein said step of monitoring the usage of said vehicle further comprises:

c1.) determining the distance traveled by said vehicle since the receipt of said first signal; and c2.) determining if a collision has occurred.

3. The method for monitoring a vehicle of claim 1 wherein said data logger includes a position determining system, said step of monitoring the usage of said vehicle further comprising:

c3.) determining if said vehicle has traveled outside of a designated area.

4. The method for monitoring a vehicle of claim 1 further comprising the steps of:

f.) determining the condition of said vehicle when said second signal is received; and g.) transmitting the condition of said vehicle.

5. The method for monitoring a vehicle of claim 4 wherein step f.) includes the steps of:

f1.) determining the amount of fuel in said vehicle; and f2.) determining whether said vehicle requires service.

6. A method for monitoring a vehicle having an electronic system that is rented from a car rental facility comprising:

a.) providing at least one transmitter at each of a plurality of car rental facilities;

b.) providing a first communication unit at each of a plurality of car rental facilities;

c.) providing a computer at each of said plurality of car rental facilities, said computer coupled to said first communication unit;

d.) transmitting a first signal from said at least one transmitter, said first signal indicating the rental of a vehicle;

e.) providing a data logger disposed within a vehicle to be rented, said data logger adapted to receive said first signal;

f.) transmitting a second signal from said at least one transmitter indicating the return of said vehicle;

g.) monitoring data relating to the usage of said vehicle at said data logger from the time that said first signal is received at said data logger until the time that said second signal is received at said data logger;

h.) transmitting said data relating to the usage of said vehicle from said data logger; and i.) receiving said data relating to the usage of said vehicle at said first communication unit, said first communication unit coupling said data relating to the condition and usage of said vehicle to said computer.

7. The method for monitoring a vehicle of claim 6 further comprising the step of:

j1.) determining the amount to charge for the rental of said vehicle based on the data relating to the usage of said vehicle.

8. The method for monitoring a vehicle of claim 6 wherein said step of monitoring data relating to the usage of said vehicle further comprises:

g1.) determining the distance traveled by said vehicle since the receipt of said first radio signal; and g2.) determining if a collision has occurred.

9. The method for monitoring a vehicle of claim 8 wherein said data logger includes a position determining system and wherein step g.) further comprises monitoring whether said vehicle has traveled outside of a designated area.

10. The method for monitoring a vehicle of claim 6 further comprising the steps of:

j.) determining the condition of said vehicle when said second radio signal is received; and k.) transmitting the condition of said vehicle from said data logger when said second radio signal is received.

11. The method for monitoring a vehicle of claim 10 wherein said step j.) further includes the steps of:

j1.) determining the amount of fuel in said vehicle; and j2.) determining whether said vehicle requires service.

12. The method for monitoring a vehicle of claim 6 wherein said at least one transmitter is a radio transmitter.

13. The method for monitoring a vehicle of claim 6 wherein said first communication unit is adapted to communicate using infrared methods.

* * * * *